(12) United States Patent
Thunell et al.

(10) Patent No.: US 11,198,223 B2
(45) Date of Patent: Dec. 14, 2021

(54) SAFE TOOL CHANGER

(71) Applicant: ROBOT SYSTEM PRODUCTS IN SCANDINAVIA AB, Västerås (SE)

(72) Inventors: Mats Thunell, Enköping (SE); Jonas Martinsson, Västerås (SE); Håkan Brantmark, Västerås (SE)

(73) Assignee: ROBOT SYSTEM PRODUCTS IN SCANDINAVIA AB, Västerås (SE)

( * ) Notice: Subject to any disclaimer, the term of this patent is extended or adjusted under 35 U.S.C. 154(b) by 381 days.

(21) Appl. No.: 16/421,496

(22) Filed: May 24, 2019

(65) Prior Publication Data
US 2020/0368920 A1 Nov. 26, 2020

(51) Int. Cl.
B25J 15/04 (2006.01)
B25J 19/06 (2006.01)
B25J 9/16 (2006.01)

(52) U.S. Cl.
CPC ......... *B25J 15/0466* (2013.01); *B25J 9/1674* (2013.01); *B25J 15/0408* (2013.01); *B25J 19/06* (2013.01)

(58) Field of Classification Search
CPC .... B25J 15/0466; B25J 15/0408; B25J 19/06; B25J 9/1674; B25J 15/04; B25J 15/0416; B25J 15/0425; B25J 15/0433; B25J 15/0441; B25J 15/045; B25J 15/0458; B25J 15/0475; B25J 15/0483; B25J 15/0491
See application file for complete search history.

(56) References Cited

U.S. PATENT DOCUMENTS

| | | | |
|---|---|---|---|
| 6,840,895 B2 | 1/2005 | Perry et al. | |
| 2004/0180769 A1* | 9/2004 | Perry | B23Q 3/15546 483/1 |
| 2010/0324733 A1 | 12/2010 | Bischoff et al. | |
| 2016/0052146 A1 | 2/2016 | Berrocal et al. | |
| 2016/0059424 A1 | 3/2016 | Zachary et al. | |
| 2016/0073978 A1 | 3/2016 | Henderson et al. | |

FOREIGN PATENT DOCUMENTS

DE 102015116511 A1 3/2017

OTHER PUBLICATIONS

Translation of DE102015116511A1.

* cited by examiner

*Primary Examiner* — Adam R Mott
(74) *Attorney, Agent, or Firm* — Jacob Eisenberg

(57) ABSTRACT

A tool changer set out having a master unit and a tool unit. The master unit comprises a safety controller with two separate processing circuitries, a coupler and at least two coupling sensors. The tool unit comprises at least one tool unit sensor, the at least one tool unit sensor provides two output signals sent to the safety controller. The at least two coupling sensors individually detect if the tool unit is coupled to the master unit and the output signals are sent to the safety controller. The two separate processing circuitries are arranged to receive a request to decouple the tool unit, determine whether the tool unit is coupled to the master unit and whether the tool unit is in the tool stand, send the result of the determinations to other processing circuitry, receive a result of determinations and send a decouple signal.

9 Claims, 5 Drawing Sheets

SAFE TOOL CHANGER

FIELD OF INVENTION

The present invention relates to a tool changer for safe changing of tools.

BACKGROUND OF THE INVENTION

Robots have been used during a number of years in the industry for performing repetitive work tasks, such as welding, riveting, assembly of sub-parts and the like. However, for some work tasks there is a need to change tools at the end of the robot arm in order to increase the number of work tasks the robot can perform. Therefore, detachable connection devices have been developed, which enables the robot to automatically change tools.

To facilitate and enable the flexible use of robots in different applications, different kinds of tool changers are normally used. Such a tool changer is mounted on the robot arm and with a special connecting or coupling device it can grip and hold different tools, which are mounted on tool attachment plates. The gripping and holding of the tool must then be safe and fulfill current standards and regulations. The word "safe" used in the following text means "be consistent with relevant safety standards". In addition to the safe mechanical design and construction, also the logic controlling of coupling and decoupling of the tool changer must be safe.

Safe decoupling or opening of the tool changer means that opening is allowed only when no tool is attached in the tool changer or if a tool is attached, the tool must be in the tool stand. Current safe control and interlocking of the decoupling request signal from the robot controller normally utilizes a safety relay mounted in the robot controller cabinet and which will break the decoupling signal if opening of the tool changer shall be prevented. Normally all tool stands are equipped with switches which are connected via cabling to the safety relay. Only when all switches are indicating that all tools are placed in the tool stands, i.e. the robot is holding no tool, only then it shall be possible to open the tool changer.

Such safe solutions imply rather high costs for the additional safety relay and the physical cabling from the tool stand switches to the robot controller cabinet. In other words, a problem with existing solutions is that physical cables are needed between the tool stand switches and the robot controller cabinet which complicates setting up the system.

U.S. Pat. No. 6,840,895 B2 discloses a robotic tool changer with a safety interlock. The tool changer is schematically illustrated in FIG. 1. An interlock switch 34 is used, which is a normally open electrical contact and a plunger which is depressed by an actuating surface on the tool stand 4 to close the electrical contact. The tool cannot be decoupled from the robot arm as long as the electrical contact is open; which it is as long as the tool 5 is not in the tool stand.

A proximity detector 27 on the master unit 2 and a proximity indicator 35 on the tool unit 3 are used to detect if there is a tool unit 3 attached to the master unit 2. A relay 28 in the master unit is energized by a "tool present" signal from the proximity detector. When the controller 29 sends a signal to decouple the tool unit, the unlock signal cannot actuate the coupler 24 without passing the interlock switch 34, which is only closed when the tool is positioned within the tool stand. In other words, the tool unit can be decoupled from the master unit only when there is a "tool present" signal and when the tool is in the tool stand. There is a risk in the known solution that if there is a failure or an error in any of the input signals, the interlock switch may decouple the tool unit based on faulty information. There is thus a need for a tool changer with improved safety.

SUMMARY OF THE INVENTION

It is an aim of the present invention to at least partly overcome the above problems, and to provide an improved tool changer with improved safety when changing tools.

According to some aspects of the disclosure, it provides for a tool changer for safe changing of tools. The tool changer comprises a master unit, comprising a safety controller comprising at least two separate processing circuitries, a coupler and at least two coupling sensors. The tool changer also comprises a tool unit, comprising at least one tool unit sensor that detects if the tool unit is located in a tool stand, the at least one tool unit sensor provides two output signals and the output signals are sent to the safety controller when the tool unit is coupled to the master unit. The coupler being movable between a coupled state in which the tool unit is coupled to the master unit, the coupler comprises at least two valves and wherein the coupler is moved from the coupled state to the decoupled state when both valves are actuated, and the at least two coupling sensors individually detect if the tool unit is coupled to the master unit by means of the coupler and the output signals from the coupling sensors are sent to the safety controller. The two separate processing circuitries are arranged, individually, to:
receive a request to decouple the tool unit,
receive the output from the at least two coupling sensors and the at least one tool unit sensor,
determine whether the tool unit is coupled to the master unit by means of the coupler, based on the output from the at least two coupling sensors,
determine whether the tool unit is in the tool stand, based on the output from the at least one tool unit sensor,
send the result of the determinations to the other processing circuitry,
receive a result of determinations from the other processing circuitry,
a first of the two separate processing circuitries sends the decouple signal to actuate a first valve of the two valves and a second of the two separate processing circuitries sends the decouple signal to actuate a second valve of the two valves when the result of the determinations is the same as the received result of determinations and when the results of the determinations both indicate that:
there is no tool unit coupled to the master unit, or
the tool unit is coupled to the master unit and it is also in the tool stand, The coupler is configured to move to a decoupled state when the at least two separate processing circuitries both send a decouple signal to decouple the tool unit. This tool changer provides increased safety compared to prior art in several aspects. There are at least two sensors that individually determine whether the tool unit is coupled to the master unit. The two sensors must both indicate that it is coupled such that if there is a malfunction in either of the sensors, there will be no decoupling. Thus, if one sensor is malfunctioning, this will be immediately detected, and the tool changer will not decouple the tool unit. In other words, the coupler is configured to move to a decoupled state when the at least two separate processing circuitries both send a decouple signal to decouple the tool unit and the decouple signal is a signal sent from the two processing circuitries to a valve each.

There is at least one tool unit sensor for detecting if the tool unit is in the tool stand and it has at least two outputs, both of which must indicate the same thing for decoupling. Thus, there are two channels and both channels must indicate that the tool is in the tool stand before decoupling. So, if one channel malfunctions, there will be no decoupling.

The determination whether it is safe to decouple the tool unit is done independently by two different processing circuitries. In other words, two independent processing circuitries both receive sensor data from all sensors and determine what state the tool changer is in. There can be no decoupling if both processing circuitries do not agree on the results. Furthermore, both of the processing circuitries need to send a decouple signal for the decoupling to be initiated.

In other words, the two processing circuitries will, independently from each other, determine whether both coupling sensors indicate that the tool unit is coupled to the master unit, determine whether both channels from the tool unit sensors indicate that the tool unit is in the tool stand, and determine if the other processing circuitry reaches the same conclusions and send a decouple signal when decoupling is allowed and has been requested. Furthermore, the tool unit will not be decoupled unless both processing circuitries send the decouple signal. Due to the multiple redundancies and how the tool changer is set up, any faults or errors will be detected such that the tool unit will not be decoupled from the master unit in a non-allowed state.

According to some aspects, the at least one tool unit sensor comprises two 24V power connections that are activated by a passive circuit in the tool stand and is fed from the tool unit to the safety module when the tool unit is in the tool stand and when the tool unit is coupled to the master unit. In other words, there are two channels which indicate whether the tool unit is in the tool stand; both of which are sent to both processing circuitries. If there are any discrepancies between the signals, the tool changer will not decouple the tool unit. The passive circuit in the tool stand is a circuit that does not need a power supply, such as a RFID circuit.

According to some aspects, the at least one tool unit sensor is at least two tool unit sensors. Thus, the at least one tool unit may comprise two channels and may also be two different sensors with one channel each.

According to some aspects, the two separate processing circuitries are two different types of processing circuitries. Different types of processing circuitries may have different weaknesses and also makes calculations in different ways. It is therefore an advantage to use two different types to make the processing circuitries not only redundant in numbers, but also in how they perform calculations and how they handle data. Choosing different technologies will give higher safety rating.

According to some aspects, the two different types of processing circuitries are selected from the following types: a Microcontroller Unit (MCU), a Complex Programmable Logic Device (CPLD), a Field-Programmable Gate Array (FPGA) and Programmable Array Logic (PAL). Such circuits are accessible, affordable and robust. For example, both MCU and CPLD are cost-effective and easy to program.

According to some aspects, the at least two coupling sensors are different types of sensors. Different types of sensors use different means to sense if the master unit and the tool unit are coupled. Since different sensors may react to different things, it is an advantage to use different sensors because it improves the robustness of the system. For example, if one type of sensor is used which operation is sensitive to water and if the tool changer is used in a humid environment, another sensor can be of a type that is not sensitive to water to minimize the risk of malfunctioning of the sensors at the same time.

According to some aspects, the different types of sensors are selected from the following types: mechanical switches, electrical contacts and proximity sensors. Such types of sensors may provide stable and robust sensors with reliable output.

According to some aspects, the mechanical switch comprises a normally closed switch, giving a high signal when the tool unit is decoupled from the master unit, the electrical contact comprises a jumper connected via the tool unit to give a high signal when the tool unit is coupled to the master unit and the proximity sensors comprise inductive, magnetic, capacitive, optical and RFID sensors.

According to some aspects, the at least two separate processing circuitries are arranged, individually, to determine whether any of the received sensor outputs is indicating an unexpected state in the tool changer, and in the case of an unexpected state to not send the decouple signal. An unexpected state gives a sensor output value outside a predefined value range. Thus, there is a check in both processing circuitries, for unexpected states. An unexpected state being, for example, that two sensor values that should indicate the same state indicate different states.

BRIEF DESCRIPTION OF THE SEVERAL VIEWS OF THE DRAWINGS

The invention will now be explained more closely by the description of different embodiments of the invention and with reference to the appended figures.

DETAILED DESCRIPTION OF THE INVENTION

Figure 1:
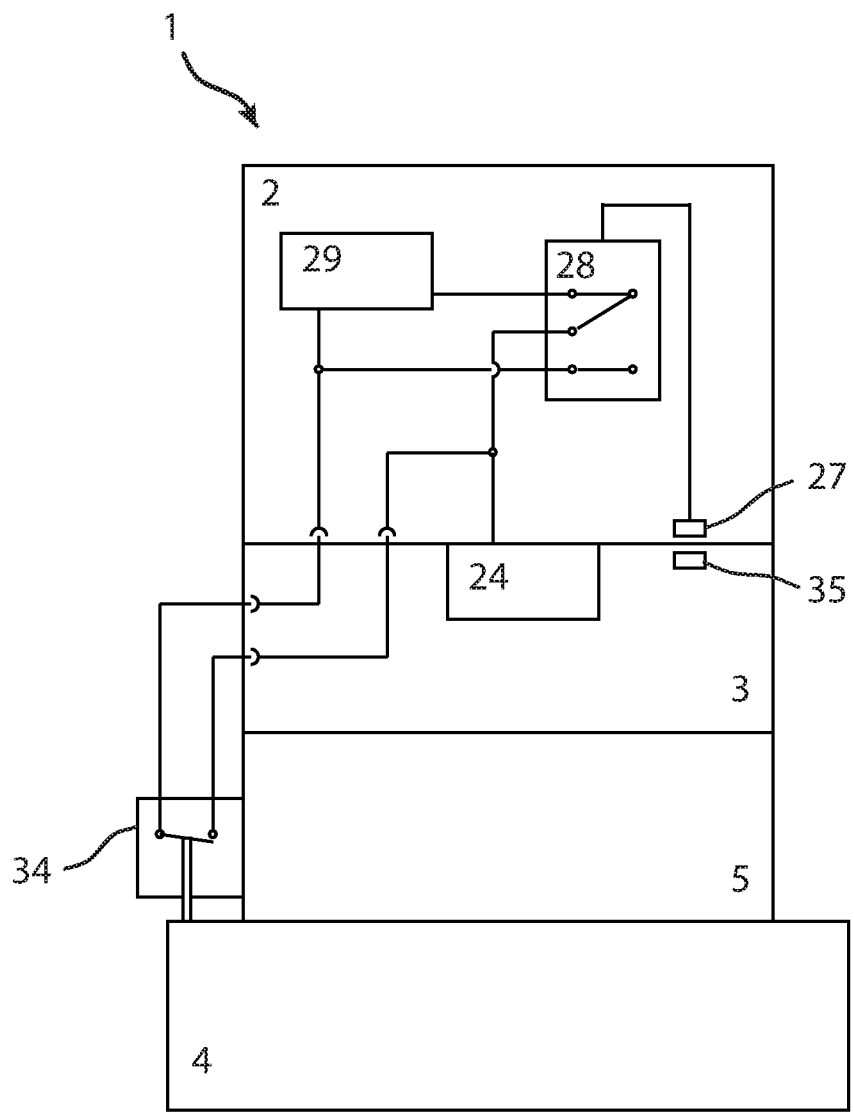
FIG. 1 shows a tool changer according to prior art U.S. Pat. No. 6,840,895 B2

Aspects of the present disclosure will be described more fully hereinafter with reference to the accompanying drawings. The device disclosed herein can, however, be realized in many different forms and should not be construed as being limited to the aspects set forth herein. Like numbers in the drawings refer to like elements throughout. The terminology used herein is for the purpose of describing particular aspects of the disclosure only and is not intended to limit the invention. As used herein, the singular forms "a", "an" and "the" are intended to include the plural forms as well, unless the context clearly indicates otherwise.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

As discussed in the background section, FIG. 1 is a schematic illustration of the solution presented in U.S. Pat. No. 6,840,895 B2 which discloses a robotic tool changer 1 with a safety interlock with a relay 28.

As also is the case in U.S. Pat. No. 6,840,895 B2, a tool changer 1 normally comprises a master unit 2 and a tool unit 3, where the master unit 2 is mounted on the robot arm with a coupling device 24, i.e. coupler, to couple the tool unit 3 with a tool 5 mounted on it.

Figure 2:
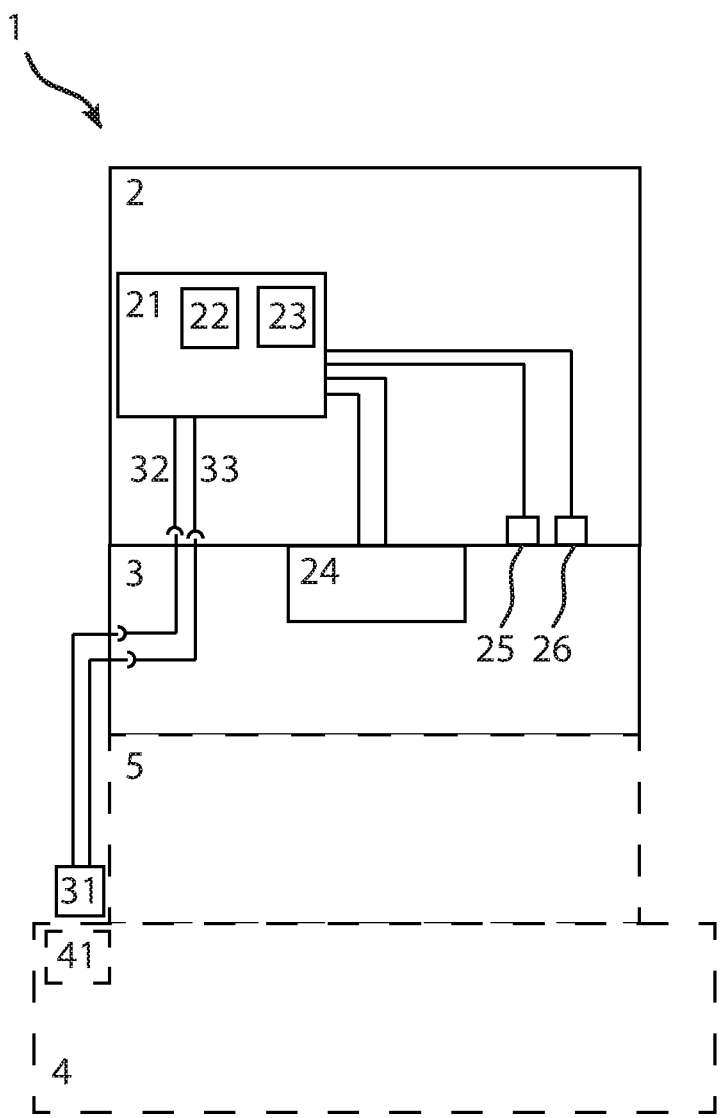
FIG. 2 shows a block diagram illustrating the disclosure according to claim 1

In this disclosure, the master unit 2 is equipped with an integral safety controller 21 to safely interlock a decouple request from the controller, which is schematically illustrated in FIG. 2. FIG. 2 is an illustration according to the broadest aspects of the disclosure.

An aspect of the present disclosure is to replace the safety relay and all the cabling between tool stands and robot controller cabinet with the proposed safety controller system. This safety controller will be an integral part of the tool changer 1 and thus include the safe interlocking of a decouple request from the robot controller.

The safety controller 21 is based on using safe inputs from different sensors to detect if the master unit 2 is coupled to a tool unit 3 and, if so, if the tool unit 3 with a tool 5 is placed in a tool stand 4. By using safe logic circuits and software, the decouple request from the robot will be interlocked by the following conditions:

Interlocking of tool changer 1, decoupling, i.e. possible to decouple only if:
1. The master unit 2 is decoupled from any tool unit 3 or
2. The master unit 2 with coupled tool unit 3 are positioned in the tool stand 4 Additionally, the disclosure will cover the following advantages:
   Automatic coupling of the tool changer 1 if a tool 5 is stuck in the tool changer 1
   Built-in supervision of all signals and sensors
   Communication via bus or physical wires
   Automatic 24 V switching off during tool change
   Automatic break of power to valves at emergency stop The Safety Unit or, in other words, the safety controller 21 is mounted on, or located in, the master unit 2 of the tool changer 1, as shown in FIG. 2. As previously discussed, FIG. 2 illustrates the disclosure according to its broadest aspects and shows a tool changer 1 for safe changing of tools. The tool changer 1 comprises a master unit 2, comprising a safety controller 21 comprising at least two separate processing circuitries 22, 23. The master unit 2 also comprises a coupler 24 and at least two coupling sensors 25, 26.

The two separate processing circuitries 22, 23 are, according to some aspects of the disclosure, two different types of processing circuitries 22, 23. Different types of processing circuitries 22, 23 may have different weaknesses and also make calculations in different ways. Some processing circuitries may, for example, be more sensitive to physical movements or to differences in temperature. It is therefore an advantage to use two different types to make the processing circuitries 22, 23 not only redundant in numbers, but also in how they perform calculations and how they handle data. Choosing different technologies will give higher safety rating. For example, both MCU and CPLD are cost effective and easy to program. The two different types of processing circuitries 22, 23 are, for example, selected from the following types: a Microcontroller Unit (MCU), a Complex Programmable Logic Device (CPLD), a Field-Programmable Gate Array (FPGA) and Programmable Array Logic (PAL). Such circuits are accessible, affordable and robust.

The tool changer 1 also comprises a tool unit 3, comprising at least one tool unit sensor 31 that detects if the tool unit 3 is located in a tool stand 4, the at least one tool unit sensor 31 provides two output signals 32, 33 and the output signals are sent to the safety controller 21 when the tool unit 3 is coupled to the master unit 2. The tool unit is a unit that is attached to a tool 5. The tool unit is used to couple the tool to the robot via the master unit. The tool unit 3 may be an integral part of the tool 5 or the tool unit may be attached to the tool for coupling the tool 5 to the robot via the tool unit and the master unit.

The at least one tool unit sensor 31 comprises, according to some aspects of the disclosure, two 24V power connections that are activated by a passive circuit 41 in the tool stand 4 and is fed from the tool unit 3 to the safety module when the tool unit 3 is in the tool stand 4 and when the tool unit 3 is coupled to the master unit 2. In other words, there are two channels 32, 33 of the output signal which indicate whether the tool unit 3 is in the tool stand 4; both of which are sent to both processing circuitries 22, 23 in the safety controller. If there are any discrepancies between the signals, the tool changer 1 will not decouple the tool unit 3. The passive circuit 41 in the tool stand 4 is a circuit that does not need a power supply, such as a RFID circuit. According to some aspects, the at least one tool unit sensor 31 is at least two tool unit sensors. Thus, the at least one tool unit 3 comprises two channels and may also be two different sensors with one channel each. In such a case, the two tool unit sensors are individual sensors that do not affect each other's output signals. Other types of sensors that may be used are inductive and magnetic sensors.

The coupler 24 is movable between a coupled state in which the tool unit 3 is coupled to the master unit 2 and a decoupled state in which the tool unit 3 is decoupled from the master unit 2. The coupler is in FIG. 2 illustrated as a box with two connections from the safety controller 21. The figure only shows a tool changer 1 with connections for illustrational purposes. The coupler is a complex part of the system and examples of implementation will be further described below.

The coupler comprises, according to some aspects of the disclosure, at least two valves and wherein the coupler is moved from the coupled state to the decoupled state when both valves are actuated and wherein a first 22 of the two separate processing circuitries 22, 23 sends the decouple signal to actuate a first valve 241 of the two valves and a second 23 of the two separate processing circuitries 22, 23 sends the decouple signal to actuate a second valve 242 of the two valves. In other words, the coupler 24 is configured to move to a decoupled state when the at least two separate processing circuitries 22, 23 both send a decouple signal to decouple the tool unit 3 and the decouple signal is a signal sent from the two processing circuitries 22, 23 to a valve each. The two valves are, for example, of double NO/NC monostable 3/2 type. A single monostable valve or single bistable valve may be used, however not with the same degree of safety as with using double monostable valves. Other factors, such as cost, may affect the choice of valve.

The at least two coupling sensors 25, 26 individually detects if the tool unit 3 is coupled to the master unit 2 by means of the coupler 24. The output signals from the coupling sensors 25, 26 are sent to the safety controller 21.

As with the processing circuitries, the at least two coupling sensors 25, 26 are also, according to some aspects of the disclosure, different types of sensors. Different types of sensors use different means to sense if the master unit 2 and the tool unit 3 are coupled. Since different sensors may react to different things, it is an advantage to use different sensors because it improves the robustness of the system. For example, if one type of sensor is used which operation is sensitive to water and if the tool changer 1 is used in a humid environment, the other sensor can be of a type that is not sensitive to water to minimize the risk of malfunctioning of the sensors at the same time. According to some aspects, the different types of sensors are selected from the following types: mechanical switches, electrical contacts and proximity sensors. Such types of sensors may provide stable and robust sensors with reliable output. According to some aspects, the mechanical switch comprises a normally closed switch, giving a high signal when the tool unit 3 is decoupled from the master unit 2, the electrical contact comprises a jumper connected via the tool unit 3 to give a high signal when the tool unit 3 is coupled to the master unit 2 and the proximity sensors comprise inductive, magnetic, capacitive, optical and RFID sensors. Choosing different technologies will give higher safety ratings. A jumper is both reliable and cheap. Inductive sensors are reliable and have good MTTF-value, Mean Time To Failure-value, than e.g. mechanical sensors.

It should be noted that both the processing circuitries and the coupling sensors may be of the same type. There are many aspects to consider when determining what processing types and sensor types to be chosen of which robustness and reliability are very important ones. The two separate processing circuitries 22, 23 both check the sensor values from all sensors and also perform a cross-check of each other to see if both processing circuitries reach the same results. In the process of determining if the processing circuitries should send a decouple signal, the two separate processing circuitries 22, 23 are arranged, individually, to:

receive a request to decouple the tool unit 3,
receive the output from the at least two coupling sensors 25, 26 and the at least one tool unit sensor 31,
determine whether the tool unit 3 is coupled to the master unit 2 by means of the coupler 24, based on the output from the at least two coupling sensors 25, 26,
determine whether the tool unit 3 is in the tool stand 4, based on the output from the at least one tool unit sensor 31,
send the result of the determinations to the other processing circuitry,
receive a result of determinations from the other processing circuitry,
send a decouple signal, to the coupler 24, to decouple the tool unit 3 from the master unit 2 by means of the coupler 24 when the result of the determinations is the same as the received result of determinations and when the results of the determinations both indicate that:
there is no tool unit 3 coupled to the master unit 2, or
the tool unit 3 is coupled to the master unit 2 and it is also in the tool stand 4

Figure 5:
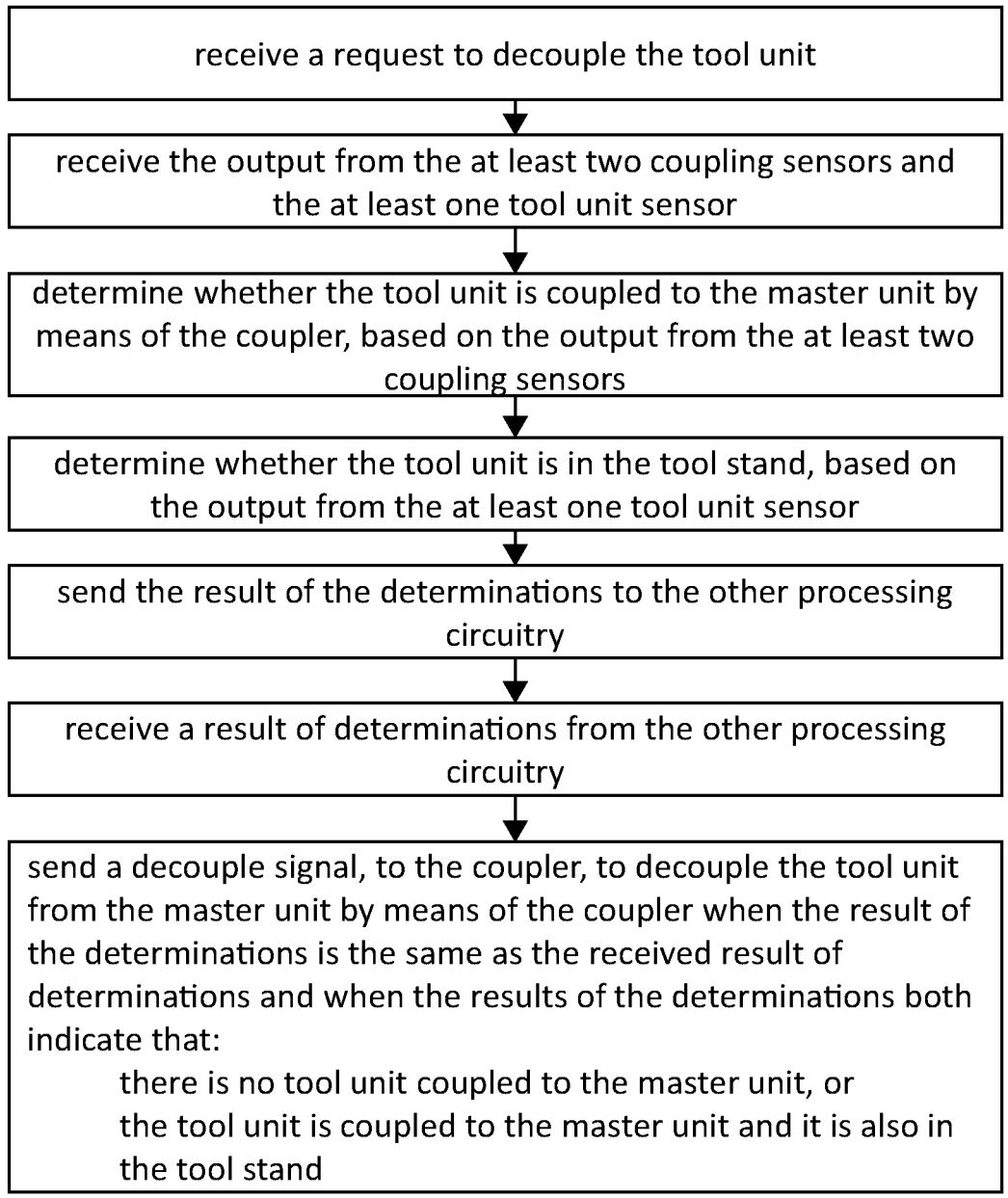
FIG. 5 shows the steps performed individually by the at least two processing circuitries

In other words, both processing circuitries perform the above steps individually. The steps of both processing circuitries are illustrated in FIG. 5.

The receiving a request is according to some aspects received from a robot controller. The receiving the output from the sensors is according to some aspects received via direct wiring to the sensors in the master unit. The determining whether the tool unit is coupled to the master unit is according to some aspects done by comparing the sensor output data to stored data which indicates which output data values are indicative of a coupled tool unit and which output data values are indicative of a decoupled tool unit. Determining whether the tool unit is in the tool stand using the sensor output from the tool unit sensor can be done in the same way. The processing circuitries may have access to internal memory storing such values for comparison or they may have access to a memory unit in the safety controller. The sending and receiving the results of the determinations is done by physical wiring between the processing circuitries.

The coupler 24 is configured to move to a decoupled state when the at least two separate processing circuitries 22, 23 both send a decouple signal to decouple the tool unit 3.

This tool changer 1 as shown in FIG. 2 and described above, provides increased safety compared to prior art in several aspects. There are at least two sensors that individually determine whether the tool unit 3 is coupled to the master unit 2. The two sensors must both indicate that it is coupled such that if there is a malfunction in either of the sensors, there will be no decoupling. Thus, if one sensor is malfunctioning, this will be immediately detected and the tool changer 1 will not decouple the tool unit 3.

The receiving a request to decouple the tool unit is according to some aspects received from a robot controller. There is at least one tool unit sensor 31 for detecting if the tool unit 3 is in the tool stand 4 and it has at least two outputs that both must indicate the same thing for decoupling. Thus, there are two channels and both channels must indicate that the tool is in the tool stand 4 before decoupling. So if one channel malfunctions, there will be no decoupling.

The determination whether it is safe to decouple is done independently by two different processing circuitries 22, 23. In other words, two independent processing circuitries 22, 23 both receive sensor data from all sensors and determine what state the tool changer 1 is in. There can be no decoupling if both processing circuitries 22, 23 do not agree on the results. Furthermore, both of the processing circuitries 22, 23 need to send a decouple signal for the decoupling to be initiated.

In other words, the two processing circuitries 22, 23 will, independently from each other, determine whether both coupling sensors 25, 26 indicate that the tool unit 3 is coupled to the master unit 2, determine whether both channels from the tool unit sensors indicate that the tool unit 3 is in the tool stand 4, and determine if the other processing circuitry reaches the same conclusions and send a decouple signal when decoupling is allowed and has been requested. Furthermore, the tool unit 3 will not be decoupled unless both processing circuitries 22, 23 send the decouple signal.

Due to the multiple redundancies and how the tool changer 1 is set up, any faults or errors will be detected such that the tool unit 3 will not be decoupled from the master unit 2 in a non-allowed state.

Please note that the tool 5 and the tool stand 4 are illustrated with dashed lines in FIG. 2. That is because they are not part of the claimed tool changer 1 but are needed in the figure to give a good overview of how the tool changer is set up.

According to some aspects, the at least two separate processing circuitries 22, 23 are arranged, individually, to determine whether any of the received sensor outputs is indicating an unexpected state in the tool changer 1, and in the case of an unexpected state to not send the decouple signal. An unexpected state gives a sensor output value outside a predefined value range. Thus, there is a check in both processing circuitries 22, 23, for unexpected states. Thus the check for unexpected states is performed in both processing circuits. An unexpected state being, for example, that two sensor values that should indicate the same state indicate different states; for example, one coupling sensor indicates that the tool unit is coupled to the master unit and the other coupling sensor indicates that the tool unit is not coupled to the master unit. The predefined value range will depend on the type of sensor used. The processing circuitries are, according to some aspects, instructed to determine if any sensor outputs are outside of a predetermined range, or in other words, deviate from an expected state, by comparing the sensor output data with stored values in a database. The stored values being indicative of which sensor values are associated with a coupled state and which values are associated with a decoupled state.

The robot controller can, according to some aspects, order an emergency stop to the safety controller. The intention is to break power to the valves in order to avoid electric shock for service personnel when making service. It is an automatic break of power to valves at an emergency stop. Also, when there are internal errors in the tool changer, i.e. a fault state that has been detected by the processing circuitries, the power to the valves will be broken. This is the same as setting the tool changer in a locked state.

Figure 3:
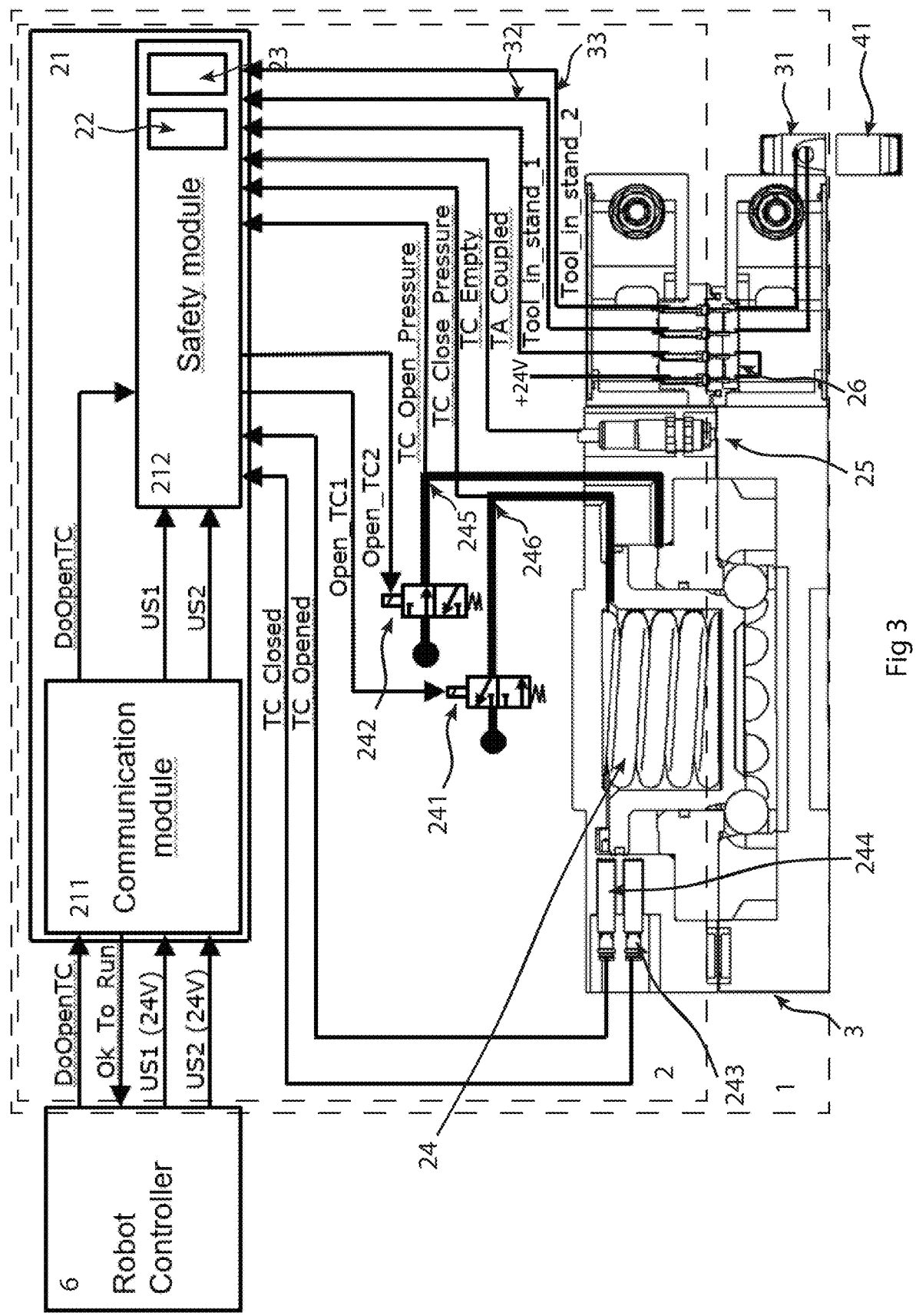
FIG. 3 shows an illustration of the tool changer according to some aspects of the disclosure

FIG. 3 illustrates an exemplary system with a tool changer according to some aspects of the disclosure. The tool unit 3 is shown below the master unit 2 in the coupled position. The safety controller 21 here includes two modules, the communication module 211 and the safety module 212. The communication module may also be an integral part of the safety module 212. The safety module includes all safety related parts for the interlocking functions as described above and below, while the communication module is used for the signal interfacing with the robot controller. Such interfacing may be done via an I/O module or Bus Module. The exemplary system has two valves 241, 242 of double NO/NC monostable 3/2 type, which in their passive, i.e. stable state, will keep the tool changer 1 closed. Due to the redundancy of the system, both valves must be actuated to open the tool changer. The valve control signals are referenced to as "Open TC1" and "Open TC2" in this document.

The safety module includes two separate processing circuitries 22, 23 for "Open TC1" and "Open TC2" which are working independently for the logic control and which are implemented with different programmable technologies. To detect if the tool changer 1 is empty, two coupling sensors 25, 26 are used in parallel. One coupling sensor 25 is using a normally closed switch "TC_Empty", giving a high signal to detect if the tool changer 1 is empty, and another coupling sensor 26 is using a jumper "TA_Coupled", via the tool unit 3 to detect if a tool is attached to the tool changer 1. The "TC_Empty" and "TA_Coupled" signals combined are referenced to as the "TA_Present" signal in this document. In this example, an inductive proximity sensor 25 is used for "TC_Empty" and an electric jumper connection 26 is used for "TA_Coupled". However, any mechanical or electrical or proximity sensor may be used.

After having left a tool in the tool stand 4, the tool changer 1 is lifted in an open or, in other words, decoupled condition. However, if the "TA_Present" signals indicate that a tool unit 3 is still in the tool changer 1 when lifted up from the tool parking stand, the tool changer 1 will automatically close. This is to safely keep the tool unit 3 with tool in a coupled position, with no risk of dropping it unintentionally.

To detect if the tool changer 1 with tool 5 is positioned in the tool stand 4, double "Tool_in_stand" output signals 32, 33 are used, shown in the FIG. 3 as Toolin_Stand_1 and Tool_In_Stand_2. In this example an RFID sensor is used, which is a passive circuit 41 in the tool stand, but any proximity sensor may be used. Both processing circuitries 22, 23 are using the two "TA_Present" signals and the two "Tool_in_stand" signals. Since both signals, "Open TC1" and "Open TC2", must be active to decouple, i.e. to open the tool changer 1, a fault in either circuit will prevent the tool changer 1 to open in dangerous situations. Furthermore, the results from both processing circuitries must be equal for the outputs to be set active. For controlling the opening and closing of the tool changer, a signal from the robot controller is used to alert the safety controller 21 that an opening is ordered. Depending on the configuration of the communication module, this signal could be sent in different ways, e.g. via bus or via discrete signals, but is referred to as "DoOpenTC".

The coupler 24 comprises, according to some aspects, a locking piston (not shown) which is actuated when the tool unit 3 is coupled. For internal supervision of the tool changer 1, two magnetic sensors 243, 244 are used to establish the position of the tool changer locking piston. The two magnetic sensors have an output signal each, the "TC_Closed" and "TC_Opened" signals, respectively, to the safety controller. Furthermore, the pressure on each side of the locking piston is supervised by two pressure sensors 245, 246 with output signals referred to as "TC_Close_Pressure" and "TC_Open_Pressure". These sensors and their output signals are used for the control of the correct function of the hardware. Thus, according to some aspects, the master unit 2 comprises two separate pressure sensors arranged on two sides of the locking piston for supervising air pressure, the output from the pressure sensors is received in the safety controller 21.

In addition to the control signal interlocking as described above, the tool changer 1 also has status monitoring, e.g. if a tool unit 3 is coupled (TA_Present) or if the tool unit 3 with tool is positioned in a tool stand 4 ("Tool_in_stand"). These status signals may be read in the robot controller 6. In addition to the signals mentioned above, diagnostic status of the tool changer is provided via combined signals of the tool changer sensors. Thus, the "OK_To_Run" signal is produced by comparing sensor values to the expected values given the input to the system ("DoOpenTC"). A "TC_Open_Ready" signal from the safety controller 21 to the robot controller 6 is produced in the same manner as the "OK_To_Run" signal, but gives the status of whether the tool changer is in a coupled or decoupled position.

If the internal supervision indicates an unexpected condition, then the safety controller 21 will automatically change to a fault state and set both output signals, "Open_TC1" and "Open_TC2", low to keep the tool changer 1 in a coupled position.

For supervision purposes, the robot controller may receive fault signals, fault code signals and/or sensor signals from the safety controller.

The safety controller 21 may also include a relay, which is used to break the 24 V power to the tool, if any, during the coupling or decoupling process. This is to prevent arching.

Figure 4:
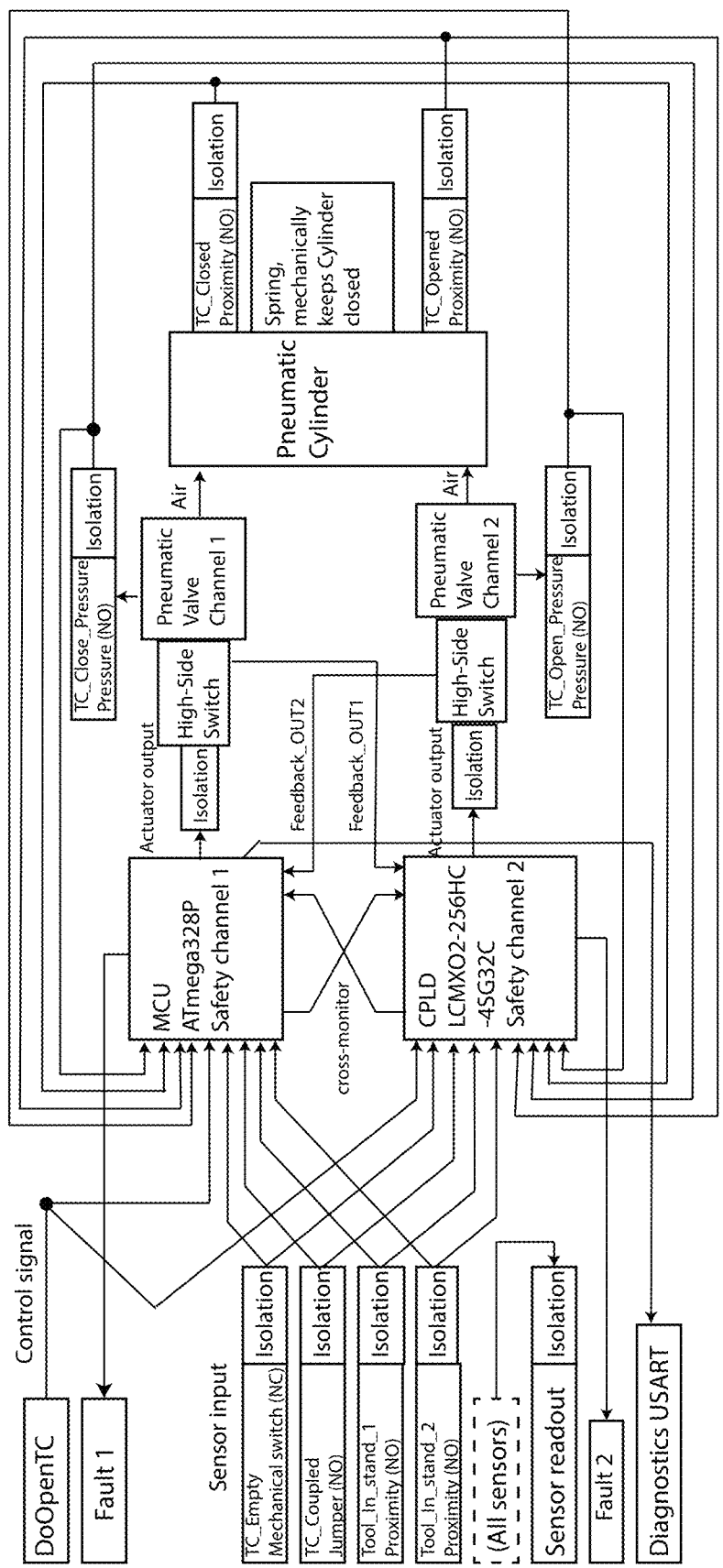
FIG. 4 shows an illustration of the hardware architecture of the tool changer according to some aspects of the disclosure

FIG. 4 describes the hardware architecture according to some aspects of the disclosure. According to some aspects, this is another way of illustrating the set up in FIG. 3. However, some details may differ which is up to the implementation of the tool changer. The two separate processing circuitries 22, 23, mentioned above, are here a first circuit with Microcontroller Unit, MCU, and a second circuit with Complex Programmable Logic Device, CPLD. The circuits send actuator outputs to activate the pneumatic valves controlling the pneumatic cylinder if a decoupling is ordered and if the processors have determined that it is ok to decouple. The boxes marked with "Isolation" are to indicate where there is electrical insulation. The electrical insulators are to remove interference such that only the wanted signal passes through. The electrical insulator is, for example, an optical insulator.

Starting from the upper left corner, a DoOpenTC control signal is sent from a robot controller to the two processing circuitries. The sensors used as input for the processing logic are shown to the left. These are TC_Empty, TA_Coupled, Tool_in_stand_1 and Tool_in_stand_2. All four signals are sent to both processing circuitries.

There are a number of signals that are sent to the robot controller. Both processing circuitries send fault signals, Fault 1 and Fault 2 if they have detected some faults in the tool changer which requires a stop of the robot. The processing circuitries also send a Diagnostics signal to the robot controller. In this example of set up, all sensors also send their output signals to the robot controller.

With the cross monitoring between the processing circuitries, it is illustrated that the processing circuitries send their determined sensor states to each other as described above. The processing circuitries will check each other and activate the outputs to the valves only when equal results are calculated. With the signals Feedback_OUT1/2, also the actuating power circuits in the valves will be cross-checked resulting in a full stop of the decoupling if they are different.

As can be seen in FIG. 4, there are two pneumatic valves; Channel 1 and Channel 2. The air pressure in both valves is monitored with sensors giving the signals TC_Close_Pressure and TC_Open_Pressure. When both valves are actuated, one valve is used to actuate a Pneumatic Cylinder on the opening side and another valve is used to evacuate air from the closing side to decouple the tool unit. A spring may be used to mechanically keep the cylinder closed if the valves do not work or if air pressure is missing. Two magnetic sensors with the output signals "TC_Closed" and "TC_Opened" are also used here to monitor the position of the tool changer locking piston.

The invention claimed is:

1. A tool changer for safe changing of tools, the tool changer comprises:
   a master unit, comprising:
   a safety controller comprising at least two separate processing circuitries,
   a coupler comprising at least two valves,
   at least two coupling sensors,
   a tool unit, comprising:
   at least one tool unit sensor that detects if the tool unit is located in a tool stand, the at least one tool unit sensor provides two output signals and the output signals are sent to the safety controller when the tool unit is coupled to the master unit,
   the coupler being movable between a coupled state in which the tool unit is coupled to the master unit and a decoupled state in which the tool unit is decoupled from the master unit, wherein the coupler is moved from the coupled state to the decoupled state when both valves are actuated, and the at least two coupling sensors individually detect if the tool unit is coupled to the master unit by means of the coupler and the output signals from the coupling sensors are sent to the safety controller,
   wherein the two separate processing circuitries are arranged, individually, to:
   receive a request to decouple the tool unit,
   receive the output from the at least two coupling sensors and the at least one tool unit sensor,
   determine whether the tool unit is coupled to the master unit by means of the coupler, based on the output from the at least two coupling sensors,
   determine whether the tool unit is in the tool stand, based on the output from the at least one tool unit sensor,
   send the result of the determinations to the other processing circuitry,
   receive a result of determinations from the other processing circuitry,
   a first of the two separate processing circuitries sends a decouple signal to actuate a first valve of the two valves and a second of the two separate processing circuitries sends the decouple signal to actuate a second valve of the two valves when the result of the determinations is the same as the received result of determinations and when the results of the determinations both indicate that:
   there is no tool unit coupled to the master unit, or
   the tool unit coupled to the master unit and it is also in the tool stand,
   wherein the coupler is configured to move to a decoupled state when the at least two separate processing circuitries both send a decouple signal to decouple the tool unit.

2. The tool changer according to claim 1, wherein the at least one tool unit sensor comprises two 24V power connections that are activated by a passive circuit in the tool stand and is fed from the tool unit to the safety module when the tool unit is in the tool stand and when the tool unit is coupled to the master unit.

3. The tool changer according to claim 1, wherein the at least one tool unit sensor is at least two tool unit sensors.

4. The tool changer according to claim 1, wherein the two separate processing circuitries are two different types of processing circuitries.

5. The tool changer according to claim 4, wherein the two different types of processing circuitries are selected from the following types: a Microcontroller Unit, a Complex Programmable Logic Device, a Field-Programmable Gate Array and Programmable Array Logic.

6. The tool changer according to claim 1, wherein the at least two coupling sensors are different types of sensors.

7. The tool changer according to claim 6, wherein the different types of sensors are selected from the following types: mechanical switches, electrical contacts and proximity sensors.

8. The tool changer according to claim 7, wherein the mechanical switch comprises a normally closed switch, giving a high signal when the tool unit is decoupled from the master unit, the electrical contact comprises a jumper connected via the tool unit to give a high signal when the tool unit is coupled to the master unit and the proximity sensors comprise inductive, magnetic, capacitive, optical and RFID sensors.

9. The tool changer according to claim 1, wherein the at least two separate processing circuitries are arranged, individually, to:
   determine whether any of the received sensor outputs is indicating an unexpected state in the tool changer, and in the case of an unexpected state:
   do not send the decouple signal,
   wherein an unexpected state gives a sensor output value outside a predefined value range.

* * * * *